(12) United States Patent
Eckert

(10) Patent No.: US 6,549,283 B2
(45) Date of Patent: Apr. 15, 2003

(54) METHOD AND SYSTEM FOR DETERMINING THE DEGREE OF POLARIZATION OF LIGHT

(75) Inventor: John Eckert, Bridgeport, NY (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/894,250

(22) Filed: Jun. 27, 2001

(65) Prior Publication Data

US 2003/0007151 A1 Jan. 9, 2003

(51) Int. Cl.$^7$ .................................................. G01J 4/00
(52) U.S. Cl. ........................................ 356/369; 250/225
(58) Field of Search ...................... 356/369; 250/225; 372/6, 29.1, 29.011, 29.012, 29.013, 29.014, 29.016, 29.02, 29.021, 29.022, 29.023

(56) References Cited

U.S. PATENT DOCUMENTS

| | | | | |
|---|---|---|---|---|
| 5,633,959 A | * | 5/1997 | Niki et al. ..................... | 385/11 |
| 6,043,887 A | * | 3/2000 | Allard et al. ................. | 356/364 |
| 2002/0044282 A1 | * | 4/2002 | Moeller et al. ............. | 356/369 |

* cited by examiner

Primary Examiner—Stephone B. Allen
Assistant Examiner—Eric J Spears

(57) ABSTRACT

Source light of unknown polarization is input into a polarization controller. The polarization controller transforms the polarization of the source light to a plurality of different polarizations. The transformed source light output by the polarization controller is input to a fixed polarizer, which passes a maximal transmitted intensity of the transformed source light at a given transformation perpendicular to an axis of propagation of the source light. The polarizer passes a minimal transmitted intensity of the transformed source light at a transformation orthogonal to the transformation at which the maximal transmitted intensity is passed. The discriminated transformed source light output by the fixed polarizer is input to a light-wave power meter, which measures the intensity thereof. The maximal and minimal measured transmitted intensities of the discriminated transformed source light can be used to determine the DOP of the source light. In the alternative, Mueller calculus can be used to determine the degree of polarization when at least four polarization transformations are performed by the polarization controller and angles by which a half-wave plate and a quarter-wave plate of the polarization controller are rotated are known.

41 Claims, 2 Drawing Sheets

METHOD AND SYSTEM FOR DETERMINING THE DEGREE OF POLARIZATION OF LIGHT

BACKGROUND OF THE INVENTION

1. Technical Field of the Invention

The present invention relates in general to determining the degree of polarization of light having unknown polarization and, more particularly, to determining the degree of polarization by minimizing the effects of polarization dependence of a light-wave power meter.

2. Description of Related Art

Light is a transverse electromagnetic wave. If light has an electric field vector that resides in a particular fixed plane, the light is said to be polarized in that particular fixed plane. Two orthogonal polarized planar light waves of the same frequency result in a polarized electric field. The light's polarization state is determined by the relative amplitudes and phases of these two light waves.

Unpolarized natural light, such as, for example, sunlight, can be conceptualized as a plurality of randomly-oriented atomic sources, with each source emitting a source of polarized light for only tens of nanoseconds. When electromagnetic waves of equal frequency are super-imposed on one another, they yield a polarized resultant electromagnetic wave. When uncorrelated electromagnetic waves are continuously emitted by a natural light source, such as, for example, the sun, the polarization state of the light emitted by the natural light source varies randomly. If the period of the emitted light's polarization state is shorter than what can be perceived, the light is said to be unpolarized.

Light is most typically a mixture of polarized and unpolarized light and is, therefore, said to be partially polarized. Some percentage of the partially-polarized light has a non-random phase relationship. The degree of polarization (DOP) of light is defined as:

$$DOP = \frac{I_{pol}}{I_{pol} + I_{unpol}} \qquad (1)$$

wherein $I_{pol}$ and $I_{unpol}$ are measured intensities of a polarized light component and of an unpolarized light component, respectively. DOP is a ratio of the polarized light component ($I_{pol}$) to the total light ($I_{pol}+I_{unpol}$). DOP can range from 0 to 1. Sometimes DOP is referred to as a percentage.

If the DOP of a source of linearly-polarized light is to be measured, a linear polarizer can be rotated in the path of the linearly-polarized light. At some angle during the rotation of the linear polarizer, a maximal transmitted light intensity will be found. Perpendicular to the angle at which the maximal transmitted light intensity is found, a corresponding minimal transmitted intensity of the light will be found. If the light is 100% linearly polarized, the minimal transmitted intensity will equal 0 and the DOP will equal 1. If, however, the DOP of totally unpolarized light is measured, as the polarizer is rotated, the transmitted light will have the same intensity for all orientations of the linear polarizer. In this case, the DOP equals 0.

Most light is neither totally polarized nor totally unpolarized, but is rather a combination thereof. When partially-linearly polarized light is transmitted through a linear polarizer and the linear polarizer is rotated about an axis of propagation of the light, the partially-linearly-polarized light will have a maximal, as well as a minimal, non-zero, transmitted intensity. The maximal and the minimal non-zero transmitted intensities will be 90° apart from one another in rotation of the linear polarizer about the axis of propagation of the light.

The polarized transmitted intensity component of the light is represented by:

$$I_{pol} = I_{max} - I_{min} \qquad (2)$$

A resolved unpolarized component of the light contributes:

$$I_{min} = \frac{I_{unpol}}{2} \qquad (3)$$

Therefore, substituting equations 2 and 3 into equation 1 yields:

$$DOP = \frac{I_{max} - I_{min}}{I_{max} + I_{min}} \qquad (4)$$

The above-described technique for measuring the DOP of partially-linearly-polarized light has been presented in many optical texts. However, linear polarization is an extreme example of elliptical polarization. Most typically, light is partially-elliptically polarized. When the light is partially-elliptically polarized, the measurement technique described above will not yield satisfactory results, because the technique requires the polarized component of the light to be linear. A more general technique is required to measure the DOP for any polarization state.

In Mueller calculus, power and polarization of light can be completely defined by the Stokes vector of the light. The Stokes vector (S) comprises four vectors: $S_0$, $S_1$, $S_2$, and $S_3$, which define the intensity, preference for horizontal polarization, preference for +45° polarization, and preference for right-circular polarization, respectively. S is usually written as a column vector as follows:

$$S = \begin{bmatrix} S_0 \\ S_1 \\ S_2 \\ S_3 \end{bmatrix} \qquad (5)$$

All possible polarization states of light can be uniquely represented by a Stokes vector pointing from the center of a sphere to a point on the surface of the sphere.

Any optical component, such as, for example, a wave plate (e.g., a retarder) or a polarizer, can be expressed as a 4×4 matrix called a Mueller matrix. Below are Mueller matrices for a linear polarizer, a quarter-wave plate, and a half-wave plate, respectively, as a function of rotation about an axis of propagation of a light source:

$$M_{pol}(c) = \begin{bmatrix} 1 & \cos(2c) & \sin(2c) & 0 \\ \cos(2c) & \cos^2(2c) & \sin(2c)\cos(2c) & 0 \\ \sin(2c) & \sin(2c)\cos(2c) & \sin^2(2c) & 0 \\ 1 & 0 & 0 & 0 \end{bmatrix} \qquad (6)$$

$$M_{qwp}(e) = \begin{bmatrix} 1 & 0 & 0 & 0 \\ 0 & 0.5[\cos(4e)+1] & 0.5\sin(4e) & -\sin(2e) \\ 0 & 0.5\sin(4e) & 0.5[-\cos(4e)+1] & \cos(2e) \\ 0 & \sin(2e) & -\cos(2e) & 0 \end{bmatrix} \qquad (7)$$

-continued $$M_{hwp}(b) = \begin{bmatrix} 1 & 0 & 0 & 0 \\ 0 & \cos(4b) & \sin(4b) & 0 \\ 0 & \sin(4b) & -\cos(4b) & 0 \\ 0 & 0 & 0 & -1 \end{bmatrix} \quad (8)$$

The linear polarizer ($M_{pol}$) is rotated an angle c, the quarter-wave plate ($M_{qwp}$) is rotated an angle e, and the half-wave plate ($M_{hwp}$) is rotated an angle b about the axis of propagation of the light source.

An incident polarized light wave, characterized by a Stokes vector $S_{in}$, interacts with an optical component, characterized by its Mueller matrix $M_{device}$, such that an emerging light wave can be characterized by an output Stokes vector $S_{out}$, wherein:

$$S_{out} = M_{device} \cdot S_{in} \quad (9)$$

More generally, if a series of optical components represented by $M_n \cdot \ldots \cdot M_3 \cdot M_2 \cdot M_1$ are encountered by the incident polarized light wave represented by $S_{in}$, the Stokes vector $S_{out}$ that describes light transformed by the series of components can be represented as:

$$S_{out} = M_n \cdot \ldots \cdot M_3 \cdot M_2 \cdot M_1 \cdot S_{in} \quad (10)$$

A polarizer in effect acts as a discriminator that passes a maximal transmitted intensity of light having a polarization state that coincides with the polarization of the polarizer and a minimal transmitted intensity at a polarization state orthogonal thereto. In addition to linear polarizers, elliptical and circular polarizers are also known.

The intensity of the light emerging from the polarizer is typically measured using a light-wave power meter. An ideal light-wave power meter has no polarization dependence (PD) and also has perfect linearity throughout a measurement range of the light-wave power meter. One of the keys to accurate measurement of the DOP of light of unknown polarization is the ability of the polarizer to discriminate between different states of polarization.

To measure the DOP of linearly-polarized light, the linear polarizer must be rotated at least 180° about the axis of propagation of the light in order to capture the minimal and maximal transmitted intensities of the light. However, rotation of the polarizer causes problems. As the polarizer is rotated, the light-wave power meter is subjected to a plurality of states of polarization, which lead to measurement uncertainty due to polarization dependence (PD) of the light-wave power meter. PD is a power-loss mechanism that varies as the polarization of an input light source to the light-wave power meter changes.

Many applications require that the DOP of light be determined very precisely. An example is a Raman amplifier, which requires very low DOP light. Other applications require very great DOP, or a precise DOP somewhere between 0 and 1. Therefore, a method and system for precisely measuring the DOP of light of unknown polarization that eliminates the drawbacks mentioned above and other drawbacks is needed.

SUMMARY OF THE INVENTION

These and other drawbacks are overcome by embodiments of the present invention, which provides a method and system for accurately determining the degree of polarization (DOP) of light while minimizing measurement inaccuracies caused by polarization dependence of a light wave power meter. In an embodiment of the present invention, a method of determining the DOP of source light includes transforming source light to a state of polarization, discriminating the transformed source light, and measuring a transmitted intensity of the discriminated transformed source light. The steps of transforming, discriminating, and measuring are repeated at least once, thereby yielding a plurality of measured transmitted intensities. The DOP is determined based on at least two of the plurality of measured transmitted intensities.

In another embodiment of the present invention, a system for determining the DOP of source light includes a polarization controller adapted to transform a polarization state of the source light to a plurality of states of polarization and a fixed polarizer adapted to discriminate the transformed source light. The system also includes a light-wave power meter adapted to measure a transmitted intensity of the discriminated transformed source light and means for determining the DOP based on at least two of a plurality of measured transmitted intensities of the discriminated transformed source light.

In another embodiment of the present invention, a method of determining the DOP of source light includes transforming the source light to a state of polarization, discriminating the transformed source light, and measuring a transmitted intensity of the discriminated transformed source light. The steps of transforming, discriminating, and measuring are repeated at least three times, thereby yielding at least four measured transmitted intensities. The DOP is determined based on the at least four measured transmitted intensities using Mueller calculus.

In another embodiment of the present invention, a system for determining the DOP of source light includes a polarization controller adapted to transform a polarization state of the source light to at least four states of polarization, a fixed polarizer adapted to discriminate the transformed source light, and a light-wave power meter adapted to measure a transmitted intensity of the discriminated transformed source light. The system also includes means for determining the DOP using Mueller calculus based on the at least four measured transmitted intensities of the discriminated transformed source light

BRIEF DESCRIPTION OF THE DRAWINGS

A more complete understanding of exemplary embodiments of the present invention can be achieved by reference to the following Detailed Description of Exemplary Embodiments of the Invention when taken in conjunction with the accompanying Drawings, wherein.

DETAILED DESCRIPTION OF THE EXEMPLARY EMBODIMENTS OF THE INVENTION

Figure 1:
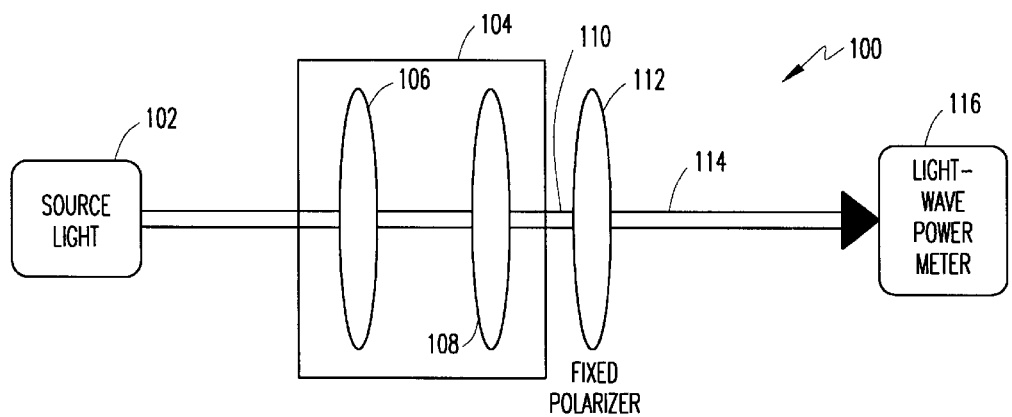
FIG. 1 is a block diagram of an embodiment of the present invention that employs a polarization controller that comprises rotatable half and quarter wave plates.

Any polarization state of linearly-polarized light can be transformed to any other state of linear polarization by transmitting the light through a rotatable half-wave plate $M_{hwp}(\alpha)$ such that:

$$S_{lpol} = M_{hwp}(\alpha) \cdot S_{in} \quad (11)$$

A light wave emerging from the half-wave plate ($S_{lpol}$) can then be passed through a fixed linear polarizer represented by $M_{lpol}$ and the transmitted intensity of the light output by the fixed linear polarizer ($S_{out}$) measured with a light-wave power meter, such that:

$$S_{out} = M_{lpol} \cdot S_{lpol} \quad (12)$$

$$S_{out} = M_{lopl} \cdot M_{hwp}(\alpha) \cdot S_{in} \quad (13)$$

As the half-wave plate is rotated by $\alpha$, a minimal and a maximal transmitted intensity of the light output by the fixed linear polarizer can be measured using the light-wave power meter and the DOP determined from the measurements. With this technique for measuring the DOP, the light-wave power meter is subjected to only a single polarization state; therefore, the PD of the light-wave power meter does not contribute to DOP measurement uncertainty.

To measure the DOP for any possible polarization state, another transformation is required. Any polarization state of elliptically-polarized light ($S_{epol}$) can be transformed to a particular state of linear polarization ($S_{lopi}$) by propagating the light through a quarter-wave plate $M_{qwp}(\beta)$, such that:

$$S_{lpol} = M_{qwp}(\beta) \cdot S_{epol} \quad (14)$$

$$S_{out} = M_{lpol}(\delta) \cdot M_{qwp}(\beta) \cdot S_{epol} \quad (15)$$

wherein the quarter-wave plate is rotated by $\beta$ and the linear polarizer is rotated by $\delta$, about the axis of propagation of the incident light wave.

After the light wave has been transformed to a linear polarization state, the linear polarizer is rotated to find the minimal and maximal transmitted intensities, the minimal and maximal transmitted intensities are measured and recorded, and the DOP is determined from the minimal and maximal intensities. However, as noted above, rotation of the linear polarizer introduces PD into the DOP measurement uncertainty.

In the alternative, a half-wave plate $M_{hwp}$ can be inserted in the path of the light wave and rotated to transform the state of linear polarization, while the linear polarizer remains at a fixed orientation. The DOP is calculated from the recorded minimal and maximal transmitted intensities, such that:

$$S_{out} = M_{lpol} \cdot M_{qwp}(\beta) \cdot M_{hwp}(\alpha) \cdot S_{in} \quad (16)$$

wherein the half-wave plate is rotated by $\alpha$, the linear polarizer remains substantially fixed, and the quarter-wave plate is rotated by $\beta$.

When the linear polarizer remains substantially fixed as described above, a single polarization state is propagated to the light-wave power meter, which eliminates the PD of the light-wave power meter from the DOP measurement uncertainty. The DOP of any light source can thus be measured with minimal PD. The half-and-quarter-wave-plate combination transforms any polarization state of source light to any desired output polarization state via rotation of the plates. The linear polarizer, which acts as a discriminator, passes the maximal transmitted intensity when the light has the same polarization as the linear polarizer and passes the minimal transmitted intensity when the linear polarizer is orthogonal to the polarization of the light. The polarization controller can transform any input polarization state to any output polarization state. Therefore, although fixed linear polarizers are sometimes described herein for purposes of illustration, any fixed polarizer (e.g. linear, circular, or elliptical) can be used in accordance with the principles of the present invention.

FIG. 1 is a block diagram of an embodiment of the present invention that employs a polarization controller that comprises rotatable half and quarter-wave plates. A system 100 includes a source light 102, which is input to a polarization controller 104. The polarization controller 104 includes a rotatable half-wave plate 106 and a rotatable quarter-wave plate 108. Although the source light 102 is shown encountering the rotatable half-wave plate 106 first and then the rotatable quarter-wave plate 108, the rotatable half-wave plate 106 and the rotatable quarter-wave plate 108 can, in accordance with the principles of the present invention, be placed in reverse order, such that the source light 102 encounters the rotatable quarter-wave plate 108 first and then encounters the rotatable half-wave plate 106. The rotatable half-wave plate 106 and the rotatable quarter-wave plate 108, are both rotatable, such that, regardless of the polarization state of the source light 102, this polarization state of the source light 102 can be transformed to any state of polarization via rotation of the half-wave plate 106 and rotation of the quarter-wave plate 108.

In an embodiment of the present invention, the rotatable half-wave plate 106 and the rotatable quarter-wave plate 108 are each rotated to a plurality of positions. The plurality of positions yield transformed light 110 of a plurality of transformed polarizations. After exiting from the polarization controller 104, the transformed source light 110 encounters a fixed polarizer 112. The fixed polarizer 112, which acts as a discriminator, is held in a substantially fixed position, such that the fixed polarizer 112 passes a maximal transmitted intensity of polarized light at a particular transformation and passes a minimal transmitted intensity at a transformation orthogonal to the angle at which the maximal transmitted intensity is passed.

After the transformed light 110 passes through the fixed polarizer 112, discriminated transformed light 114 results therefrom and is input to a light-wave power meter 116. The light-wave power meter 116 measures a transmitted intensity of the transformed discriminated light 114. In an embodiment of the present invention, both of a maximal transmitted intensity of the transformed discriminated light 114 and a minimal transmitted intensity of the transformed discriminated light 114 measured by the light-wave power meter 116 are used to determine the DOP of the source light 102.

In another embodiment of the present invention, at least four transformations of the source light 102 are performed by rotation of the rotatable-half wave plate 106 and the rotatable quarter-wave plate 108 by known angles. Thereafter, following discrimination of the transformed light 110 by the fixed polarizer 112, the transmitted intensity of the transformed discriminated light 114 is measured by the light-wave power meter 116 for each of the at least four polarization transformations of the source light 102. From the at least four transformations, the corresponding known angles of rotation of the plates 106 and 108, and their corresponding transmitted intensities, the DOP is determined using Mueller calculus.

Figure 2:
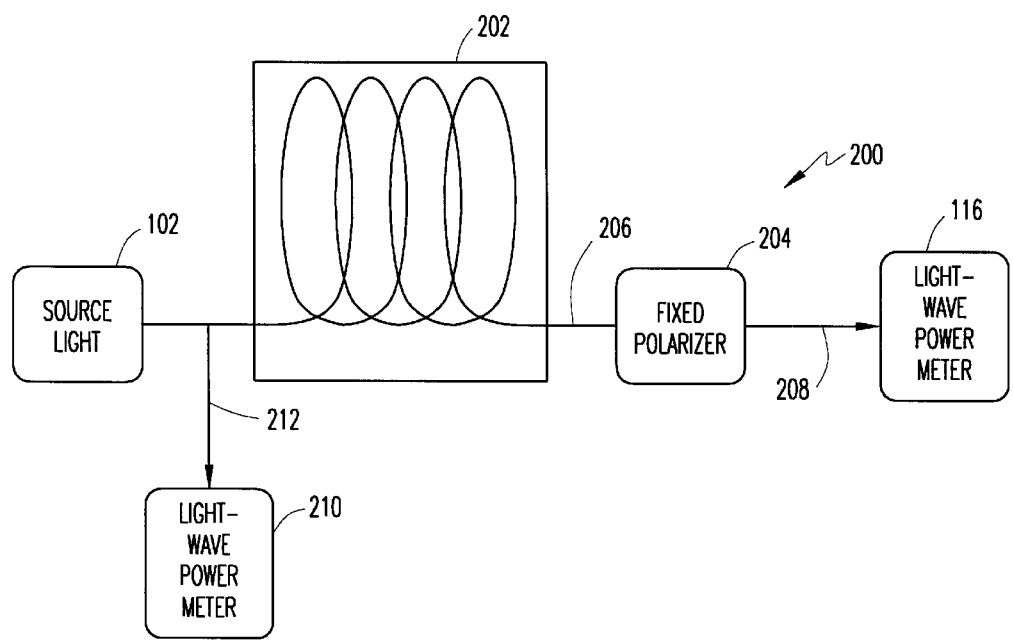
FIG. 2 is a block diagram of an embodiment of the present invention that employs an adjustable-four-loop polarization controller.

FIG. 2 is a block diagram of an embodiment of the present invention that employs an adjustable-four-loop polarization controller. A system 200 includes the source light 102, an adjustable-four-loop polarization controller 202, a fixed polarizer 204, and the light-wave power meter 116. In a similar fashion to that described with respect to FIG. 1, the source light 102 is input to the polarization controller 202. The polarization controller 202 is used to transform the polarization state of the source light 102 to a plurality of polarization states.

Upon exit from the polarization controller 202, transformed source light 206 is input to the fixed polarizer 204. The fixed polarizer 204, which acts as a discriminator, is substantially fixed such that transformed discriminated light 208 of a maximal transmitted intensity emerges from the fixed polarizer 204 at a particular transformation. At an angle orthogonal to the transformation at which the maximal transmitted intensity is passed, a minimal transmitted intensity is passed by the fixed polarizer 204.

Upon exit from the fixed polarizer 204, the transformed discriminated source light 208 is input to the light-wave power meter 116 so that the transmitted intensity of the discriminated transformed source light 208 can be measured. The measured maximal and minimal transmitted intensities of the discriminated transformed source light 208 are used to determine the DOP of the source light 102.

Because the adjustable-four-loop polarization controller 202 does not permit a determination akin to the known angles of rotation of the rotatable half-wave plate 106 and of the quarter-wave plate 108, Mueller calculus cannot be used in accordance with the adjustable-four-loop polarization controller to determine the DOP of the source light 102. When the adjustable-four-loop polarization controller 202 is used, the DOP of the source light 102 can be determined using the maximal and minimal transmitted intensities measured by the light-wave power meter 116.

Also shown in connection with FIG. 2 is a second light-wave power meter 210, which measures a transmitted intensity of the source light 102. The light-wave power meter 210 can be connected to the source light 102 via, for example, a fiber coupler 212. The light-wave power meter 210 can be used to account for fluctuations in transmitted intensity of the source light 102, so that these fluctuations do not introduce errors into determination of the DOP of the source light 102.

For example, if fluctuations between the maximal transmitted intensity and the minimal transmitted intensity of the discriminated transformed source light 208 at the light-wave power meter 116 occur due to power fluctuations of the source light 102, these fluctuations are detected at the light-wave power meter 210 and can therefore be accounted for by normalizing the maximal and the minimal intensities of the discriminated transformed source light 208 accordingly. However, use of the light-wave power meter 210 is often not required, because the source light 102 will often exhibit constant power. The light-wave power meter 210 and the fiber coupler 212 can similarly be used in conjunction with the system 100 shown in FIG. 1.

Polarization controllers, such as, for example, the polarization controllers 104 and 202, are commonly used to transform the polarization state of light. The most popular types are wave-plate and fiber-loop-based polarization controllers, although other types of polarization controllers can be used in accordance with the principles of the present invention. To measure the DOP of a light source of unknown polarization, the polarization controller could theoretically be set to transform the polarization state of the light to that of the polarizer, in order to yield maximal transmitted intensity at the light-wave power meter. After measurement of the maximal transmitted intensity, the polarization controller could theoretically then be set to generate a state orthogonal to that at which the maximal transmitted intensity is located. The minimal transmitted intensity, which is found at the orthogonal state, could then be measured. The DOP could then be calculated from the minimal and maximal transmitted intensity measurements. However, this procedure is not possible because it requires a priori knowledge of the polarization of the source light, which is what is unknown and is therefore to be determined. In order solve the problem described above and to determine the DOP, the polarization controller can instead be set to continuously scan a plurality of polarization transformations while the light-wave power meter measures the transmitted intensities.

Figure 3:
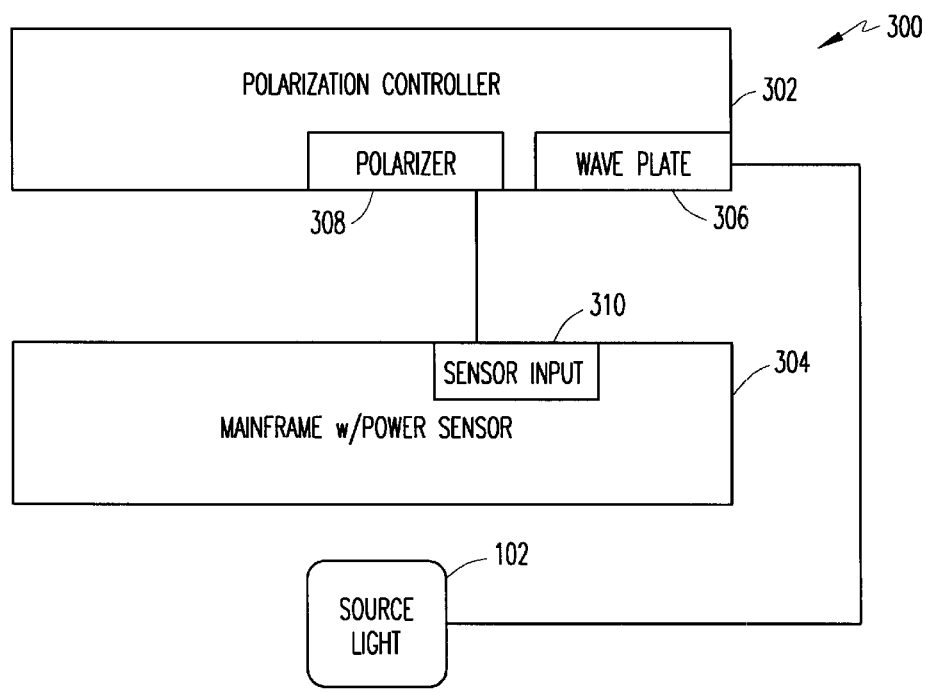
FIG. 3 is a block diagram of an exemplary implementation of the embodiment of the present invention shown in FIG. 1.

FIG. 3 is a block diagram of an exemplary implementation of the embodiment of the present invention shown in FIG. 1. A system 300 includes, for example, a polarization controller 302, which is, for example, an Agilent 8169A polarization controller, and a mainframe computer with power sensor 304, which is, for example, an Agilent 8164A mainframe computer with an Agilent 81635A power sensor. The source light 102 is connected to a wave-plate input 306, which can be either a half-wave plate or a quarter-wave plate, of the polarization controller 302. The wave-plate input 306 of the polarization controller 302 can correspond to either the half-wave plate 106 or the quarter-wave plate 108 of FIG. 1. Although not explicitly shown, the polarization controller 302 includes both a quarter-wave plate and a half-wave plate that correspond to the half-wave plate 106 and the quarter-wave plate 108, respectively.

A polarizer port 308, which has been fixed in a particular position, is connected to a sensor input 310 of the mainframe computer with power sensor 304. The mainframe computer with power sensor 304 corresponds to the light-wave power meter 116 and also includes a computer that can be used to record the maximal and minimal measured transmitted intensities input into the sensor input 310 and determine the DOP therefrom. In addition, the mainframe computer with power sensor 304 can be used to record the at least four measured transmitted intensities and the corresponding rotations of the half-wave plate 106 and the quarter-wave plate 108 and to perform the necessary Mueller calculus operations in order to determine the DOP therefrom. Although the mainframe computer with power sensor 304 is shown, a general-purpose computer familiar to those having ordinary skill in the art can be used in accordance with the principles of the present invention to perform the necessary calculations to determine the DOP of the source light 102.

Figure 4:
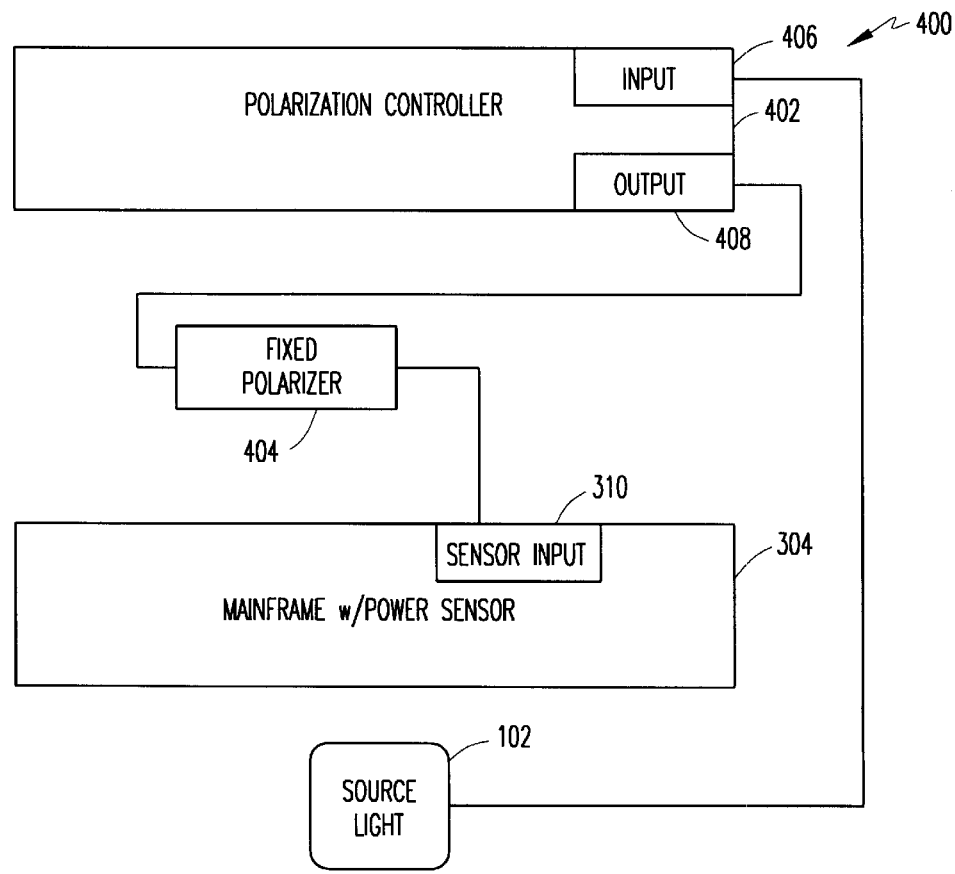
FIG. 4 is an exemplary implementation of the embodiment of the present invention shown in FIG. 2.

FIG. 4 is an exemplary implementation of the embodiment of the present invention shown in FIG. 2. A system 400 includes a polarization controller 402, which is, for example, an Agilent 11896A polarization controller, a fixed polarizer 404, and a mainframe computer with power sensor 304, which can be, for example, an Agilent 8164A mainframe computer with an Agilent 81635A power sensor. The Agilent 11896A fiber-loop-based polarization controller performs polarization retardation (i.e., transformation) by stress-based birefringence of four loops of single-mode fiber. As the four loops are rotated through their range, a plurality of polarization transformations are generated. The polarization controller 402 corresponds to the polarization controller 202 of FIG. 2.

The source light 102 is input to an input port 406 of the polarization controller 402. An output port 408 of the polarization controller 402 is connected to the fixed polarizer 404, which corresponds to the fixed polarizer 204. The fixed polarizer 404 output is connected to the sensor input 310 of the mainframe computer with power sensor 304. As described above with respect to FIG. 3, the mainframe computer with power sensor 304 can be used to record the maximal and minimal transmitted intensities of the discriminated transformed light 208 and to determine the DOP therefrom.

Commercially-available polarization controllers, such as, for example, the Agilent 11896A and the Agilent 8169A, have a built-in function that can scan a plurality of polarization transformations. The measurement period is dependent on how long the polarization controller takes to cover a sufficient number of states. The polarization controller is an important building block of an optical test system because it enables transformation of a plurality of states of polarization of source light while maintaining a constant total power.

In a preferred embodiment, the light-wave power meter must be fast enough to keep up with the scan rate of the polarization controller. If the states of polarization change too fast for the light-wave power meter to keep pace with the polarization controller, the light-wave power meter will tend to return the power averaged over its acquisition time. This can be problematic, especially when searching for a minimal transmitted intensity, since the rate of change is most typically greatest there. For high DOP measurements, light-wave power meter linearity is a concern because it directly contributes to DOP measurement uncertainty. For low DOP measurements, light-wave power meter non-linearity contribution tends toward zero.

Accuracy of the DOP determination is determined by the ability of the system to find and accurately measure the minimal and maximal transmitted intensities. Finding $I_{max}$ and $I_{min}$ depends on the scan time and scan rate of the polarization controller. The maximal scan rate is determined by the light-wave power meter acquisition time period. If the scan rate is too great, the light-wave power meter will average the power and the minimal intensity will be missed. The scan time needs to be long enough so that the polarization controller scans enough transformation states for the desired measurement certainty.

A system and method have been described that permit measurement of the DOP using widely-available instrumentation and employ polarization state transformation properties, a polarization controller, and a polarizer to discriminate the states of polarization of the transformed source light, including those corresponding to minimal and maximal transmitted intensities. PD is eliminated from the DOP measurement uncertainty by providing a constant polarization at the light-wave power meter.

Although embodiment(s) of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the invention defined by the following claims.

I claim:

1. A method of determining the degree of polarization (DOP) of source light comprising:
    measuring source light intensity in order to account for fluctuations in the source light's transmitted intensity;
    transforming source light to a state of polarization;
    discriminating the transformed source light;
    measuring a transmitted intensity of the discriminated transformed source light;
    repeating the steps of transforming, discriminating, and measuring at least once, thereby yielding a plurality of measured transmitted intensities; and
    determining the DOP based on at least two of the plurality of measured transmitted intensities.

2. The method of claim 1, wherein the step of determining further comprises use of a maximal value and a minimal value of the plurality of measured intensities.

3. The method of claim 2, wherein the step of transforming comprises use of a polarization controller.

4. The method of claim 3, wherein the polarization controller comprises a half-wave plate and a quarter-wave plate and the step of determining further comprises use of Mueller calculus.

5. The method of claim 3, wherein the step of transforming comprises:
    rotating a half-wave plate of the polarization controller; and
    rotating a quarter-wave plate of the polarization controller.

6. The method of claim 5, wherein the plurality of measured intensities are generated via a plurality of combinations of rotational positions of the half-wave plate and the quarter-wave plate.

7. The method of claim 3, wherein the step of transforming comprises:
    rotating a quarter-wave plate of the polarization controller; and
    rotating a half-wave plate of the polarization controller.

8. The method of claim 7, wherein the plurality of measured intensities are generated via a plurality of combinations of rotational positions of the half-wave plate and the quarter-wave plate.

9. The method of claim 3, wherein the step of discriminating the transformed source light is performed via a fixed polarizer.

10. The method of claim 9, wherein the fixed polarizer outputs the transformed discriminated source light at a constant state of polarization.

11. The method of claim 3, wherein the polarization controller comprises a fiber-loop-based polarization controller.

12. The method of claim 11, wherein the step of transforming comprises use of stress-based birefringence of a plurality of fiber loops.

13. The method of claim 12, wherein the step of discriminating the transformed source light is performed via a fixed polarizer.

14. The method of claim 13, wherein the fixed polarizer outputs the transformed discriminated source light at a constant state of polarization.

15. The method of claim 1, wherein the step of measuring is performed using a light-wave power meter.

16. A system for determining the degree of polarization (DOP) of source light comprising:
    an input light-wave power meter for measuring input light intensity of said source light and for accounting for fluctuations in the source light intensity;
    a polarization controller adapted to transform a polarization state of the source light to a plurality of states of polarization;
    a fixed polarizer adapted to discriminate the transformed source light;
    a light-wave power meter adapted to measure a transmitted intensity of the discriminated transformed source light; and
    means for determining the DOP based on at least two of a plurality of measured transmitted intensities of the discriminated transformed source light.

17. The system of claim 16, wherein the plurality of measured transmitted intensities comprise a maximal and minimal value thereof, the maximal value and the minimal value each being used by the means for determining.

18. The system of claim 17, wherein the polarization controller comprises a fiber-loop-based polarization controller.

19. The system of claim 18, wherein the plurality of measured transmitted intensities are generated via stress-based birefringence of a plurality of fiber loops.

20. The system of claim 16, wherein the polarization controller comprises a rotatable quarter-wave plate and a rotatable half-wave plate.

21. The system of claim 20, wherein the plurality of measured transmitted intensities are generated via a plurality of combinations of rotational positions of the half-wave plate and the quarter-wave plate.

22. The system of claim 16, further comprising a fiber coupler adapted to receive the source light and input the source light to the input light-wave power meter.

23. The system of claim 16, further comprising means for accounting for fluctuations of transmitted intensity of the source light in determining the DOP.

24. The system of claim 16, wherein the fixed polarizer is adapted to output the transformed discriminated source light at a constant state of polarization.

25. A method of determining the degree of polarization (DOP) of source light comprising:
    measuring for intensity fluctuations in said source light;
    transforming the source light to a state of polarization;
    discriminating the transformed source light;
    measuring a transmitted intensity of the discriminated transformed source light,
    repeating the steps of transforming, discriminating, and measuring at least three times, thereby yielding at least four measured transmitted intensities; and
    determining the DOP based on the at least four measured transmitted intensities using Mueller calculus and said measured intensity fluctuations.

26. The method of claim 25, wherein the step of transforming the state of polarization comprises use of a polarization controller.

27. The method of claim 26, wherein the step of transforming the state of polarization comprises:
    rotating a half-wave plate of the polarization controller a known angle; and
    rotating a quarter-wave plate of the polarization controller a known angle.

28. The method of claim 27, wherein the step of discriminating the transformed source light is performed via a fixed polarizer.

29. The method of claim 28, wherein the fixed polarizer outputs the transformed discriminated source light at a constant state of polarization.

30. The method of claim 26, wherein the step of transforming the state of polarization comprises:
    rotating a quarter-wave plate of the polarization controller a known angle; and
    rotating a half-wave plate of the polarization controller a known angle.

31. The method of claim 30, wherein the step of discriminating the transformed source light is performed via a fixed polarizer.

32. The method of claim 31, wherein the fixed polarizer outputs the transformed discriminated source light at a constant state of polarization.

33. The method of claim 25, wherein the step of measuring is performed using a light-wave power meter.

34. A system for determining the degree of polarization (DOP) of source light comprising:
    an input source light-wave power meter adapted to measure input source light Intensity fluctuations;
    a polarization controller adapted to transform a polarization state of the source light to at least four states of polarization;
    a fixed polarizer adapted to discriminate the transformed source light;
    a light-wave power meter adapted to measure a transmitted intensity of the discriminated transformed source light; and
    means for determining the DOP using Mueller calculus based on the at least four measured transmitted intensities of the discriminated transformed source light and said measured input source light intensity fluctuations.

35. The system of claim 34, wherein the polarization controller comprises a rotatable quarter-wave plate and a rotatable half-wave plate.

36. The system of claim 34, further comprising a fiber coupler adapted to receive the source light and input the source light to the input light-wave power meter.

37. The system of claim 34, wherein the fixed polarizer is adapted to output the transformed discriminated source light at a constant state of polarization.

38. A method of determining the degree of polarization (DOP) of input source light, said method comprising:
    measuring input source light intensity fluctuations,
    selecting a plurality of selectable polarization states;
    for each selectable polarization state, transforming said source light to light of said selectable polarization state, filtering said light of said selectable polarization state to yield light of a fixed polarization state, and measuring the intensity of said light of said fixed polarization state to obtain an intensity measurement; and
    determining said DOP as a function of the intensity measurements obtained for said plurality of selectable polarization states and said measured input source light intensity fluctuations.

39. A method as recited in claim 38 wherein, in said selecting step, each of said selectable polarization states is selected by changing the orientation of one or more optical elements selected from a set consisting of half-wave plates and quarter-wave plates.

40. A system for determining the degree of polarization (DOP) of source light comprising:
    a polarization controller adapted to transform a polarization state of the source light to a plurality of states of polarization;
    a fixed polarizer adapted to discriminate the transformed source light;
    a light-wave power meter adapted to measure a transmitted intensity of the discriminated transformed source light;
    means for determining the DOP based on at least two of a plurality of measured transmitted intensities of the discriminated transformed source light;
    a second light-wave power meter adapted to measure a transmited intensity of the source light; and
    a fiber coupler adapted to receive the source light and input the source light to the second light-wave power meter.

41. A system for determining the degree of polarization (DOP) of source light comprising:
    a polarization controller adapted to transform a polarization state of the source light to at least four states of polarization;
    a fixed polarizer adapted to discriminate the transformed source light;
    a light-wave power meter adapted to measure a transmitted intensity of the discriminated transformed source light;

means for determining the DOP using Mueller calculus based on the at least four measured transmitted intensities of the discriminated transformed source light;

a second light-wave power meter adapted to measure a transmitted intensity of the source light, and a fiber coupler adapted to receive the source light and input the source light to the second light-wave power meter.

* * * * *